(12) United States Patent
Chen et al.

(10) Patent No.: US 11,765,071 B2
(45) Date of Patent: Sep. 19, 2023

(54) METHOD, NETWORK CONTROLLER AND COMPUTER PROGRAM PRODUCT FOR FACILITATING A FLOW FROM A SENDING END TO A RECEIVING END BY MULTI-PATH TRANSMISSION

(71) Applicant: NATIONAL TAIPEI UNIVERSITY OF EDUCATION, Taipei (TW)

(72) Inventors: Yeong-Sheng Chen, Taipei (TW); Chih-Heng Ke, Tainan (TW); Tai-Lin Chin, New Taipei (TW)

(73) Assignee: NATIONAL TAIPEI UNIVERSITY OF EDUCATION, Taipei (TW)

( * ) Notice: Subject to any disclaimer, the term of this patent is extended or adjusted under 35 U.S.C. 154(b) by 201 days.

(21) Appl. No.: 17/120,242

(22) Filed: Dec. 13, 2020

(65) Prior Publication Data

US 2022/0094627 A1 Mar. 24, 2022

(30) Foreign Application Priority Data

Sep. 24, 2020 (TW) .................................. 109133078

(51) Int. Cl.
*H04L 45/24* (2022.01)
*H04W 40/16* (2009.01)
*H04L 45/00* (2022.01)
*H04L 47/125* (2022.01)

(52) U.S. Cl.
CPC .............. *H04L 45/24* (2013.01); *H04L 45/38* (2013.01); *H04L 47/125* (2013.01); *H04W 40/16* (2013.01)

(58) Field of Classification Search
CPC ........ H04L 45/24; H04L 45/38; H04L 47/125
See application file for complete search history.

(56) References Cited

U.S. PATENT DOCUMENTS

| 2014/0169173 | A1* | 6/2014 | Naouri | H04L 47/122 |
| | | | | 370/237 |
| 2015/0124812 | A1* | 5/2015 | Agarwal | H04L 45/24 |
| | | | | 370/392 |
| 2017/0187629 | A1* | 6/2017 | Shalev | H04L 43/0823 |
| 2017/0346724 | A1* | 11/2017 | Calin | H04L 45/24 |
| 2019/0028374 | A1* | 1/2019 | Xu | H04L 43/0805 |
| 2020/0336420 | A1* | 10/2020 | Joshi | H04L 45/22 |

* cited by examiner

*Primary Examiner* — Donald L Mills

(57) ABSTRACT

A method for facilitating a flow from a sending end to a receiving end by multi-path transmission is introduced. The method is applied to a network controller of a software-defined network. The software-defined network includes a plurality of switches. The switches execute packet forwarding from the sending end to the receiving end. The method includes: executing, by the network controller, operations, so as for a flow from the sending end to reach the receiving end by multi-path transmission using a plurality of network paths, so as to enable the multi-path transmission to be transparent to the sending end and the receiving end. The network controller is, according to the method, configured to facilitate a transmission mechanism for multi-path stochastic switching or a transmission mechanism for multi-path stochastic switching with network coding, so as to enable multi-path transmission of the packets in one single flow and thus enhance transmission performance.

20 Claims, 10 Drawing Sheets

Sending a first control message to a first switch 210 among the switches, wherein the first switch 210 receives packets of the flow, and the first control message comprises first flow control information for informing the first switch 210 to execute packet forwarding in accordance with path weights associated with the respective network paths ~S110

Sending a second control message to a second switch 220 among the switches, wherein the second switch 220 receives packets corresponding to the flow from the network paths, the second control message comprising second flow control information for informing the second switch 220 to perform packet receiving from the network paths and perform packet forwarding to the receiving end 14 ~S120

FIG.3

METHOD, NETWORK CONTROLLER AND COMPUTER PROGRAM PRODUCT FOR FACILITATING A FLOW FROM A SENDING END TO A RECEIVING END BY MULTI-PATH TRANSMISSION

CROSS-REFERENCE TO RELATED APPLICATION

This non-provisional application claims priority under 35 U.S.C. § 119(a) on Patent Application No(s). 109133078 filed in Taiwan, R.O.C. on Sep. 24, 2020, the entire contents of which are hereby incorporated by reference.

BACKGROUND OF THE INVENTION

1. Field of the Invention

The present disclosure relates to transmission technology of facilitating a flow by multi-path transmission, and in particular to a method, network controller and computer program product of facilitating a flow from a sending end to a receiving end by multi-path transmission.

2. Description of the Related Art

In addition to text data, data transmitted by a network nowadays carries abundant video data. The transmission of video data usually requires greater bandwidth and immediacy; thus, enhancement of the network-based transmission performance is of vital importance. However, owing to unstable wirings, overloaded available bandwidth, or congestion, packet loss often happens in the course of network-based transmission of packets and thus deteriorates network-based transmission performance. The transmission performance deterioration caused by packet loss is especially severe in a wireless network environment because of signal source interference and blocker concealment which, in turn, results from unstable transmission quality and even overly long delay. The unstable transmission quality and overly long delay occurs as a result of variation in nodal mobility and wireless propagation parameters. A study shows that the probability of packet loss of most connections in a wireless network is higher than 30%. In general, networks susceptible to packet loss in the course of packet transmission are known as lossy networks. Therefore, it is important to enhance the transmission performance of data in lossy networks.

Regarding conventional network technology, the transmission of one single flow between the sending end and the receiving end is point-to-point transmission from the perspective of switches, and the routing path of the flow is fixed; thus, it is impossible for the switches to perform multi-path transmission. Therefore, in recent years, academia, industrial sector and standard-related organizations (for example, IETF, Internet Engineering Task Force), study mechanisms which use multiple paths to transmit packets in order to develop better network-based transmission performance. Thus far, many transmission mechanisms about multiple paths have been put forth, for example equal cost multipath (ECMP) routing, and IEEE 802.1aq link bridging, which use MAC address, IP address and TCP/UDP port to calculate the hash value of a flow in order to adjust the flow rate, thus transmitting several flows by different paths. The aforesaid technology requires finding several equal-cost (usually of equal available bandwidth) transmission paths. In practice, packets in a flow have the same source end and sending end. According to routing rules, if the source end IP and the destination end IP of packets are the same, the packets will be transmitted along the same path, and thus the aforesaid technology will fail to enable the same flow to attain diversions and multiplexing.

Furthermore, IETF revised the TCP protocol to put forth MPTCP (Multi-Path TCP) protocol whereby the efficiency and reliability of network-based transmission is enhanced by multiple paths. According to the MPTCP, additional subflow is started as soon as TCP connection is created and used, such that the data is distributed to a plurality of paths for transmission (and still share the same transmitting or receiving buffer zone), so as to allow each connection to have a unique connection identifier, reorganize the subflow of the same connection to become one single network flow, and allow the MPTCP protocol to configure the serial number of each subflow for the sake of detecting loss and re-sending. This design actually involves combining multiple subflows to form a flow, such that the flow is sent with multiple paths.

In an ideal situation, throughput of MPTCP must be as high as multiple, non-crossing single path links. However, in practice, the total amount of data transmitted by MPTCP is much less than expected, because packet loss rate and delay time vary from transmission path to transmission path. Therefore, in practice, implementation of MPTCP must give consideration to performance of each transmission path first, as the difference in the performance between transmission paths must be minimized in order to achieve the expected benefit of multi-path transmission. Furthermore, the MPTCP mechanism operates on the third and fourth layer protocol, which are end-to-end protocols; packets in one of the flows (or subflows) are still transmitted via the same routing path. Thus, in practice, MPTCP entails carrying out fixed, different path transmission via multiple flows (or known as subflows), respectively.

In practice, the MPTCP is available to the sending end and receiving end on the premise that each of the two ends must have at least two network cards (for example, network cards for Wi-Fi, 4G) in order to provide at least two network addresses. To confirm that the sending end and receiving end are to operate under MPTCP, it is necessary to divide data into multiple subflows at the sending end for processing and combine the multiple subflows at the receiving end to become original data. Thus, before the sending end and receiving end are operable, not only is it necessary for each of them to come with MPTCP-enabling software or necessary to alter the original application program so as for it to support MPTCP, but it is also necessary to increase the computing resources available to the sending end and receiving end at the cost of an increase in the consumption of hardware resources.

Therefore, there is still room for improvement of current transmission technology as far as the enhancement of performance of transmission of data in lossy networks is concerned.

BRIEF SUMMARY OF THE INVENTION

An objective of the present disclosure is to provide technology conducive to facilitating a flow from a sending end to a receiving end by multi-path transmission and applicable to a software-defined network (SDN), with the multi-path transmission transparent to the sending end and the receiving end. By applying the technology to an SDN, the sending end and receiving end benefit from the transmission performance enhancement resulting from the multi-path transmission of one single flow according to the technology.

To achieve at least the above objective, the present disclosure provides a method for facilitating a flow from a sending end to a receiving end by multi-path transmission, the method being applied to a network controller of a software-defined network (SDN), the SDN comprising a plurality of switches, the switches being adapted to execute packet forwarding from the sending end to the receiving end, the method comprising: executing, by the network controller, operations, so as for a flow from the sending end to reach the receiving end by multi-path transmission using a plurality of network paths, so as to enable the multi-path transmission to be transparent to the sending end and the receiving end. The operations comprise: sending a first control message to a first switch among the switches, wherein the first switch receives packets of the flow, and the first control message comprises first flow control information for informing the first switch to execute packet forwarding in accordance with path weights associated with the network paths, respectively; and sending a second control message to a second switch among the switches, wherein the second switch receives packets corresponding to the flow from the network paths, the second control message comprises second flow control information for informing the second switch to perform packet receiving from the network paths and to perform packet forwarding to the receiving end.

In an embodiment of the present disclosure, the operations further comprise acquiring a network link state of the network paths from the SDN to determine at least one path weight in the first flow control information according to the network link state.

In an embodiment of the present disclosure, the network link state comprises at least one parameter group indicative of network link attributes associated with the network paths, respectively, wherein the network link attributes are bandwidth, packet loss rate, delay, or jitter.

In an embodiment of the present disclosure, at least one parameter group of the network link state comprises a first parameter group and a second parameter group, the first parameter group representing bandwidths associated with the respective network paths, and the second parameter group representing packet loss rates associated with the respective network paths.

In an embodiment of the present disclosure, the network controller is further configured to enable the first control message to further comprise flow control information of a first network function, and the flow control information of the first network function is used to inform the first switch to forward the flow to at least one network node outside of the network paths, so as to execute the first network function.

In an embodiment of the present disclosure, the flow control information of the first network function further is used to inform the first switch to receive adjusted packets corresponding to the first network function from the at least one network node so that the first switch to execute packet forwarding according to the first flow control information and in accordance with path weights associated with the network paths, respectively.

In an embodiment of the present disclosure, the first network function comprises network coding.

In an embodiment of the present disclosure, the network controller enables the second control message to further comprise flow control information of a second network function, and the flow control information of the second network function is used to inform the second switch to perform packet receiving according to the second flow control information and then forward received packets to at least another network node outside of the network paths, so as to execute the second network function.

In an embodiment of the present disclosure, the flow control information of the second network function is further used to inform the second switch to receive adjusted packets corresponding to the second network function from the at least another network node so that the second switch performs packet forwarding to the receiving end according to the second flow control information.

In an embodiment of the present disclosure, the second network function comprises network decoding.

In an embodiment of the present disclosure, the operations further comprise: acquiring a representative network link state of the network paths from the SDN to determine at least one updated path weight in a third flow control information according to the representative network link state; and sending the third control message to the first switch, wherein the third control message comprises the third flow control information, and the first flow control information is used to inform the first switch to execute packet forwarding in accordance with the updated path weights associated with the network paths, respectively.

In an embodiment of the present disclosure, the representative network link state comprises at least one parameter group indicative of network link attributes associated with the network paths, respectively, wherein the network link attributes are bandwidth, packet loss rate, delay, or jitter.

To achieve at least the above objective, the present disclosure further provides a computer program product comprising a non-transitory storage medium storing which comprises multiple instructions, and the instructions enable a computer to execute a method for facilitating a flow from a sending end to a receiving end by multi-path transmission according to any one of the aforesaid embodiments.

To achieve at least the above objective, the present disclosure provides a network controller for use in a software-defined network (SDN). The SDN comprises a plurality of switches. The switches execute packet forwarding from a sending end to a receiving end. The network controller comprises a network interface unit and at least one processing unit. The network interface unit is configured to communicate with the SDN. The at least one processing unit is coupled to the network interface unit and configured to execute operations, so as to facilitate a flow from the sending end to the receiving end by multi-path transmission by means of the use of a plurality of network paths, so as to enable the multi-path transmission to be transparent to the sending end and the receiving end. The operations comprise: sending a first control message to a first switch among the switches, wherein the first switch receives packets of the flow, and the first control message comprises first flow control information, the first flow control information is used to inform the first switch to execute packet forwarding in accordance with path weights associated with the network paths, respectively; and sending a second control message to a second switch among the switches, the second switch receiving packets corresponding to the flow from the network paths, the second control message comprising second flow control information, the second flow control information is used to inform the second switch to perform packet receiving from the network paths and perform packet forwarding to the receiving end.

In an embodiment, the network controller is applicable to at least one of the embodiments of the aforesaid method or any combination thereof.

The above embodiments are based on an SDN and applied to multi-path transmission of the second layer in the network communication protocol models (for example, to transmit packets of one single flow in a network, intermediate forwarding nodes forward different packets via different transmission interfaces), and thus the multi-path transmission is transparent to the sending end and the receiving end. Therefore, the application of the technology to the SDN enables one single flow by multi-path transmission and thus enhances transmission performance. Furthermore, the sending end need not be configured to support two network cards, nor is it necessary for the sending end and receiving end to come with a specific software or necessary to alter original application program. Therefore, the present disclosure is practically convenient.

BRIEF DESCRIPTION OF THE DRAWINGS

FIG. 3 is a schematic flowchart of a method for facilitating a flow from the sending end to the receiving end by multi-path transmission according to an embodiment of the present disclosure.

DETAILED DESCRIPTION OF THE INVENTION

To facilitate understanding of the object, characteristics and effects of this present disclosure, embodiments together with the attached drawings for the detailed description of the present disclosure are provided.

Various means for implementing the technology of facilitating a flow from a sending end to a receiving end by multi-path transmission are provided by the present disclosure and illustrated with embodiments. The technology is based on a software-defined network (SDN), and the multi-path transmission is transparent to the sending end and the receiving end. By applying the technology to the SDN, the sending end and receiving end benefit from one single flow propagated by multi-path transmission, thus enhancing transmission performance.

Figure 1:
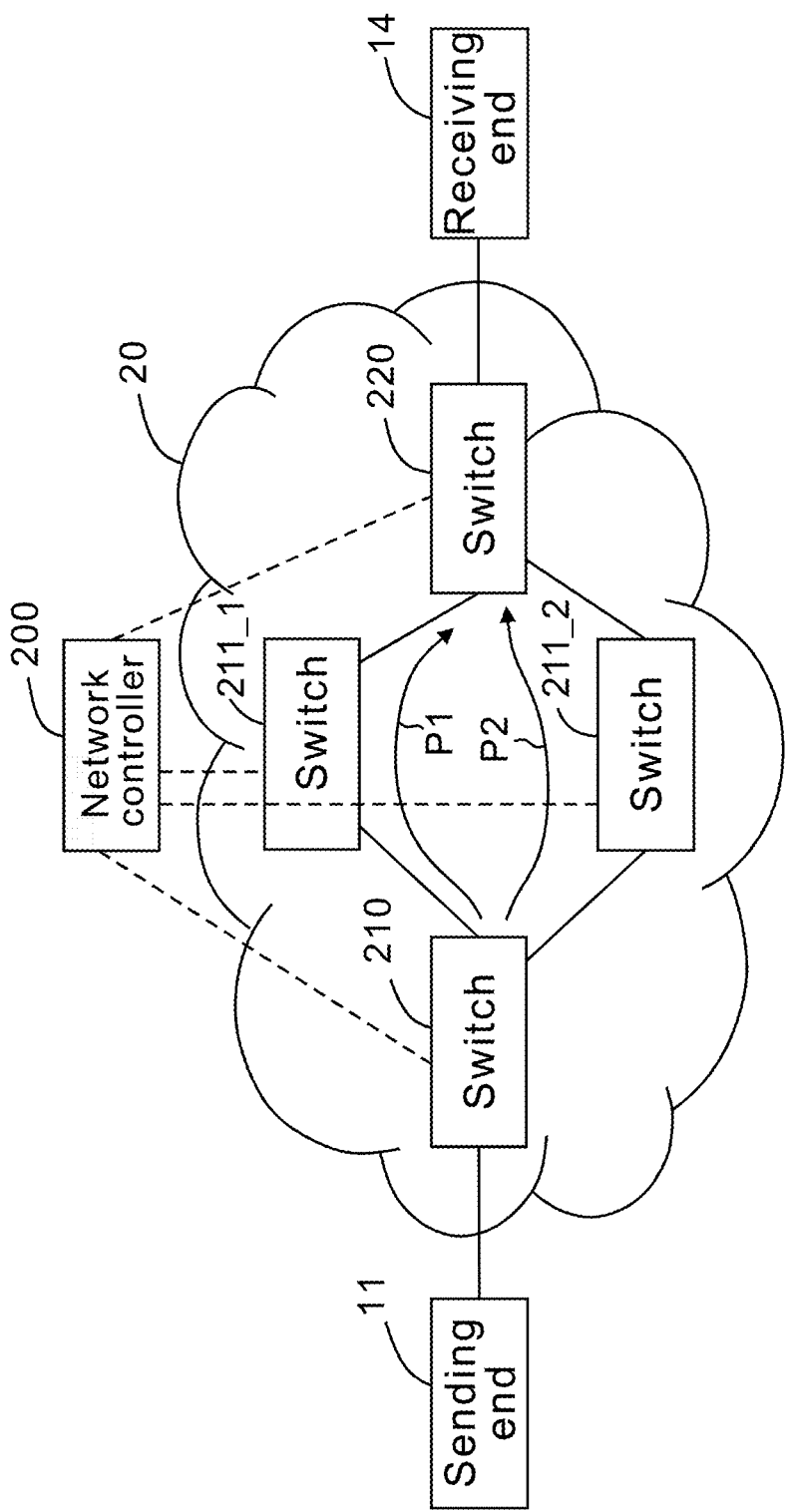
FIG. 1 is a schematic view of a network framework based on an SDN conducive to facilitating a flow from a sending end to a receiving end by multi-path transmission according to an embodiment of the present disclosure.

Referring to FIG. 1, there is shown a schematic view of a network framework based on a software-defined network (SDN) 20 for facilitating a flow from a sending end 11 to a receiving end by a multi-path transmission 14 according to an embodiment of the present disclosure. As shown in FIG. 1, the network framework comprises the software-defined network (SDN) 20 for facilitating a flow from the sending end 11 to the receiving end by the multi-path transmission 14. For example, the flow is a video, image or audio flow or a flow with any data attribute, and packets in the flow have the same source end and sending end. The SDN 20 comprises switches which support an SDN, such as the switches 210, 211_1, 2112, 220 shown in FIG. 1. The switches forward packets from the sending end 11 to the receiving end 14. The switches are physical network switches, routers, or computing devices (for example, computers or servers) capable of computing. The SDN 20 further comprises one or more network controllers 200. The network controllers 200 execute operations to control or configure the switches' behavior, namely packet processing and forwarding, such that the flow is propagated from the sending end 11 to the receiving end 14 by multi-path transmission of a plurality of network paths (for example, network paths P1, P2 shown in FIG. 1), so as to enable the multi-path transmission to be transparent to the sending end 11 and the receiving end 14. The network path P1 is followed by the packets to travel to the receiving end 14 via the switch 210, switch 211_1, and switch 220. The network path P2 is followed by the packets to travel to the receiving end 14 via the switch 210, switch 211_2, and switch 220. This rule applies to any other network paths described later. Therefore, the network controller 200 is configured to facilitate a method for facilitating a flow from the sending end to the receiving end by multi-path transmission, so as to facilitate one single flow by multi-path transmission, which is illustrated by the embodiment of FIG. 3 and described later. For instance, the aforesaid multi-path transmission is transparent to the sending end and receiving end, such that in the presence of scenarios of application of a communication network based on the SDN, such as computer networks, the Internet, 4G, 5G or any mobile communication networks, or a hybrid communication network further coupled to a fixed network (for example, fiber optic communication or telecommunication network), the sending end 11 and the receiving end 14 can access original network communication software and benefit from one single flow by multi-path transmission to thus enhance transmission performance without any special mechanism for the aforesaid multi-path transmission. Furthermore, the multi-path transmission takes places in the second layer (Layer 2) of a network communication protocol model. Thus, the intermediate forwarding nodes can forward different packets of one single flow in the network through different transmission interfaces. For instance, the network controller 200 executes operations to control or configure behavior, such as stochastic switching to forward packets, of a switch (for example, switch 210) among the switches, so as to facilitate the flow from the sending end 11 by way of the use of a plurality of network paths. The aforesaid mechanism of carrying out stochastic switching for multi-path transmission is named as multi-path stochastic switching (MPSS), which is illustrated by embodiments and described below.

Figure 2:
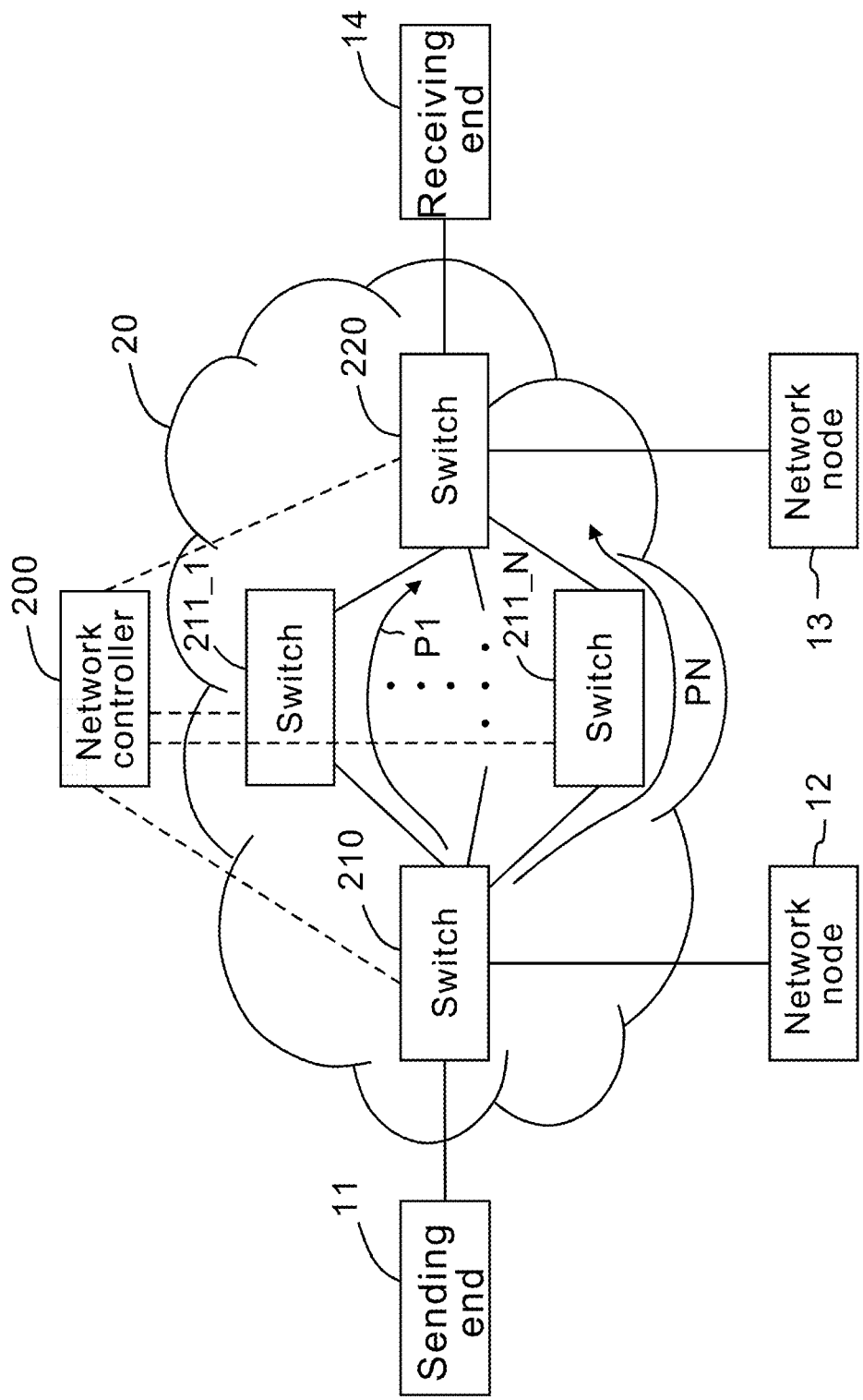
FIG. 2 is a schematic view of the network framework based on the SDN conducive to facilitating a flow from the sending end to the receiving end by multi-path transmission according to another embodiment of the present disclosure.

Referring to FIG. 2, there is shown a schematic view of the network framework based on the SDN 20 conducive to facilitating a flow from the sending end 11 to the receiving end by multi-path transmission 14 according to another embodiment of the present disclosure. The embodiment of FIG. 2 is based on the embodiment of FIG. 1 and can be integrated with network function virtualization technology to meet transmission requirements or network states. Referring to FIG. 2, the network controller 200 executes operations to control or configure the behavior of the switches 210, 211_1 to 211_N, 220, such as packet processing or forwarding, so as to facilitate the flow from the sending end 11 to the receiving end 14 by multi-path transmission by means of the use of a plurality of network paths (for example, network paths P1 to PN shown in FIG. 1, where N is a positive integer greater than 1), so as to enable the multi-path transmission to be transparent to the sending end 11 and the receiving end 14. The network controller 200 defines a virtual network function. To this end, the switch 210 forwards packets of the flow to another network node (for example, network node 12) outside of the network paths, so as to execute a network function, for example, performing network coding. Accordingly, the network controller 200 instructs the switch 220 to forward packets from the network paths to another network node (for example, network node 13) outside of the network paths, so as to execute another network function, for example, performing decoding corresponding to the network coding, and then forwarding the decoded packets to the receiving end 14. The network node is, for example, a computing device capable of computing and connecting to a network, such as a computer, server or the like. The aforesaid mechanism of performing stochastic switching with network coding for multi-path transmission is named as multi-path stochastic switching with network coding (MPSSNC), which is illustrated by embodiments and described below.

FIG. 1 and FIG. 2 depict a network framework based on an SDN conducive to facilitating a flow from a sending end to a receiving end by multi-path transmission. However, implementation of the present disclosure is not restricted to the aforesaid embodiments. For example, in the embodiment based on the network framework of FIG. 1 or FIG. 2, there may be no, one or more switches on each network path between the switches 210, 220. Furthermore, it is possible for switches to exist between the sending end 11 and the switch 210 or between the switch 220 and the receiving end 14. The network framework shown in FIG. 1 or FIG. 2 is also applicable to implementing the multi-path stochastic switching (MPSS) mechanism or the multi-path stochastic switching with network coding (MPSSNC) mechanism.

Referring to FIG. 3, there is shown a schematic flowchart of a method for facilitating a flow from the sending end to the receiving end by multi-path transmission according to an embodiment of the present disclosure. FIG. 3 depicts a method conducive to facilitating a flow from a sending end 11 to a receiving end by multi-path transmission 14 and applicable to a network controller 200 based on the SDN 20 shown in FIG. 1 or FIG. 2. The method comprises executing, by the network controller 200, operations for facilitating the flow from the sending end 11 to the receiving end 14 by multi-path transmission by means of the use of a plurality of network paths, so as to enable the multi-path transmission to be transparent to the sending end 11 and the receiving end 14. As shown in FIG. 3, the operations include those operations illustrated in steps S110 to S120, wherein the method is illustrated by FIG. 1 or FIG. 2 to enable persons skilled in the art to gain insight into how to implement the method. Implementation of the present disclosure is not restricted to the aforesaid embodiments. The method is carried out in a situation where a plurality of network paths are found.

In step S110, the network controller 200 sends a first control message to a switch among the switches, wherein the switch receives packets of the flow from the sending end 11 directly or indirectly. The first control message comprises first flow control information. The first flow control information is used to inform the switch to forward packets in accordance with the path weights associated with the network paths, respectively. For instance, the network controller 200 executes the operation of step S110 to control or configure a switch among the switches, such as the switch 210, including sending packets to different links via at least two packet forwarding interfaces.

In step S120, the network controller 200 sends a second control message to a switch among the switches, wherein the switch receives packets corresponding to the flow (for example, packets whose destination is the receiving end 14) from the network paths. The second control message comprises second flow control information. The second flow control information is used to inform the switch to perform packet receiving from the network paths and perform packet forwarding to the receiving end 14. For instance, the network controller 200 executes the operation of step S120 to control or configure a switch among the switches, such as the switch 220, including sending packets from different links to the receiving end 140 with at least two packet forwarding interfaces.

By applying the aforesaid method to an SDN, not only is the multi-path transmission transparent to the sending end and the receiving end, but the sending end and receiving end also benefit from the transmission performance enhancement resulting from the multi-path transmission of one single flow according to the method of the present disclosure.

As mentioned before, various ways of implementation of the present disclosure can be attained with the network framework of FIG. 1 or FIG. 2. In addition to the switches 210, 220, the network framework may or may not have any other switches. Therefore, given the network framework which has any switches other than the switches 210, 220, persons skilled in the art can control any other switches (for example, 211_1 through 211_N) with the method of FIG. 3, according to the network structure, and by technology pertaining to a software-defined network, so as to effectuate multi-path transmission, such as multi-path stochastic switching (MPSS) mechanism or multi-path stochastic switching with network coding (MPSSNC) mechanism, using the network controller 200.

The method of FIG. 3 is further implemented in another way. For example, the method is processed or adjusted according to a transmission or network situation and exemplarily described below.

In step S110, the network controller 200 communicates with the switch 210, such that the switch 210 forwards packets in accordance with the path weights associated with the network paths, respectively, so as to enable the switch 210 to perform stochastic switching to forward packets through different paths in a probabilistic manner. In an embodiment, the network controller 200 configures a group table in the switch 210 on a path to be a select mode with the OpenFlow protocol and forwards packets with multiple paths; meanwhile, the network controller 200 determines the path weights of transmission paths according to the weight configuration of motion water buckets (i.e., output port) in the select mode. For instance, the configuration of weight and purpose of adjustment is to make good use of the available bandwidths of the paths. Path failures or congestions, if there are, do not affect users severely, and the forward probability of the network path is allocated to the other paths to restore traffic flow, because of multi-path simultaneous transmission.

For instance, a stochastic routing mechanism is applied to the network controller 200 using the Select-type group table in the OpenFlow framework. The method is carried out in two steps: (1) providing probability of packet forwarding to each output port; and (2) effecting stochastic switching with switches. Step (2) involves calculating a routing path or putting, upon assumption that the routing path is known, addresses of the same category in identical flow entries in the flow table as many as possible. Since the flow has identical output ports and the same output probability value, the network controller 200 returns the same flow rate to identical groups. The OpenFlow specification is about introduction of the concept "weights" into each bucket among motion water buckets in the group table. The network controller 200 provides the weight of each bucket (bucket weight) and specifies output port probability. Each bucket forwards packets to an output port by "output to port" (out_to_port).

The selection method of the group table in the OpenFlow includes selecting one of the buckets according to bucket weight and accordingly executing an operation related to the bucket. Thus, in practice, the select method entails generating a random number and then selecting a corresponding bucket according to the random number, wherein its algorithm is, for example, expressed by the pseudo code shown in Table 1.

TABLE 1

Procedure SELECT (m, w[ ])
//m=the number of buckets
//w[i]=the weight of bucket i, 0<=i <=m-1
Begin
r = rand( ); //generate a random number
w = w[0];
for (i = 0; i < m; i++)
{
if (r <= m)
return(i); //bucket i is selected
else
w = w + w[i+1];
}
End An embodiment of the present disclosure is implemented with Open vSwitch (OVS) which supports the OpenFlow specification. The Open vSwitch (OVS) is a software-based virtual switch with open-source code, integrates into plenty virtualized platforms, and is capable of internetworking. Each OpenFlow switch has one or more dedicated OpenFlow flow tables, and each flow table has OpenFlow routing rules about packet processing, i.e., flow entries. Each OpenFlow routing rule comprises fields, such as match field bit, executed operation, and priority. The match field comprises source ports for packets and headers of packets, such as source IP address, destination port serial number, and source MAC address.

Each flow table contains therein a plurality of flow entries data. Each flow entry comprises compliant contents, a counter, and instructions to be issued with regard to compliant network packets. Each flow entry corresponds to a corresponding flow transmitted within the network. With the OpenFlow protocol, an OpenFlow controller (for example, the network controller 200 shown in FIG. 1 or FIG. 2) can create, alter and delete the flow entries. The OpenFlow controller is the core of the SDN. Network administrators and developers can communicate with OVS switch hardware through open original code provided by the OpenFlow protocol, configure the flow tables and define transmission paths (or routing paths) for packets.

The group table includes a number of group entries, each of which specifies the actions for a group. A flow entry can point to a group entry. Thus, the packets matching a flow entry that then points to the same group entry are in the same group. Therefore, the actions specified in a particular group entry are performed on all of the data packets in this group. The group tables are of four types: All, Select, Indirect and Failover, which specify different forwarding methods. The Select method involves selecting one of the buckets according to the weight assigned to the bucket and executing an operation related to the bucket; thus, to send a packet, it is feasible to select a port which the packet is to be forwarded to and allow a flow to undergo multi-path transmission stochastically according to the bucket weights.

In an embodiment, given the network framework of FIG. 1, the multi-path transmission flow from the sending end 11 is forwarded to the receiving end 14 via the switch 210, switch 2111, and switch 220 of the network path P1, with a 60% chance of forwarding the packets from the switch 210 to the switch 211_1 and a link bandwidth of 30 Mbps. Furthermore, packets are forwarded to the receiving end 14 via the switch 210, switch 211_2, and switch 220 of the network path P2, with a 40% chance of forwarding the packets from the switch 210 to the switch 211_2 and a link bandwidth of 30 Mbps. For example, Table 2 shows instruction code, the aforesaid multi-path transmission and the probability of each instance of routing can be configured with the program interface ovs-ofctl of the virtual switch of the OVS. Referring to Table 2, it is feasible to use the program interface ovs-ofctl and multiple parameters, such as add-group and group_id, to configure a switch (such as switch 210), wherein the parameters are defined by the ovs-ofctl program interface of the OVS; for further details, see the user manual provided by the official website of the ovs-ofctl program interface of the OVS (for example, http://www.openvswitch.org/support/dist-docs/ovs-ofctl.8.txt). In Table 2, the parameter configuration "bucket=weight:60, output=2" enables the switch 210 to be configured to achieve a 60% chance of forwarding packets from the switch 210 to the switch 211_1, whereas the parameter configuration "bucket=weight:40, output=3" enables the switch 210 to be configured to achieve a 40% chance of forwarding packets from the switch 210 to the switch 211_2.

TABLE 2 ovs-ofctl -O OpenFlow13 add-group tcp:127.0.0.1:6673 group_id=1,
type=select, bucket=weight:60, output=2, bucket=weight:40, output=3
ovs-ofctl -O OpenFlow13 add-flow tcp:127.0.0.1:6673
in_port=1,ip,nw_src=10.0.0.1,nw_dst=10.0.0.2,actions=group=1
ovs-ofctl -O OpenFlow13 add-flow tcp:127.0.0.1:6674
in_port=1,ip,nw_src=10.0.0.1,nw_dst=10.0.0.2,actions=output=2
ovs-ofctl -O OpenFlow13 add-flow tcp:127.0.0.1:6675
in_port=1,ip,nw_src=10.0.0.1,nw_dst=10.0.0.2,actions=output=2
ovs-ofctl -O OpenFlow13 add-flow tcp:127.0.0.1:6676
in_port=1,ip,nw_src=10.0.0.1,nw_dst=10.0.0.2,actions=output=3
ovs-ofctl -O OpenFlow13 add-flow tcp:127.0.0.1:6676
in_port=2,ip,nw_src=10.0.0.1,nw_dst=10.0.0.2,actions=output=3

Figure 4:
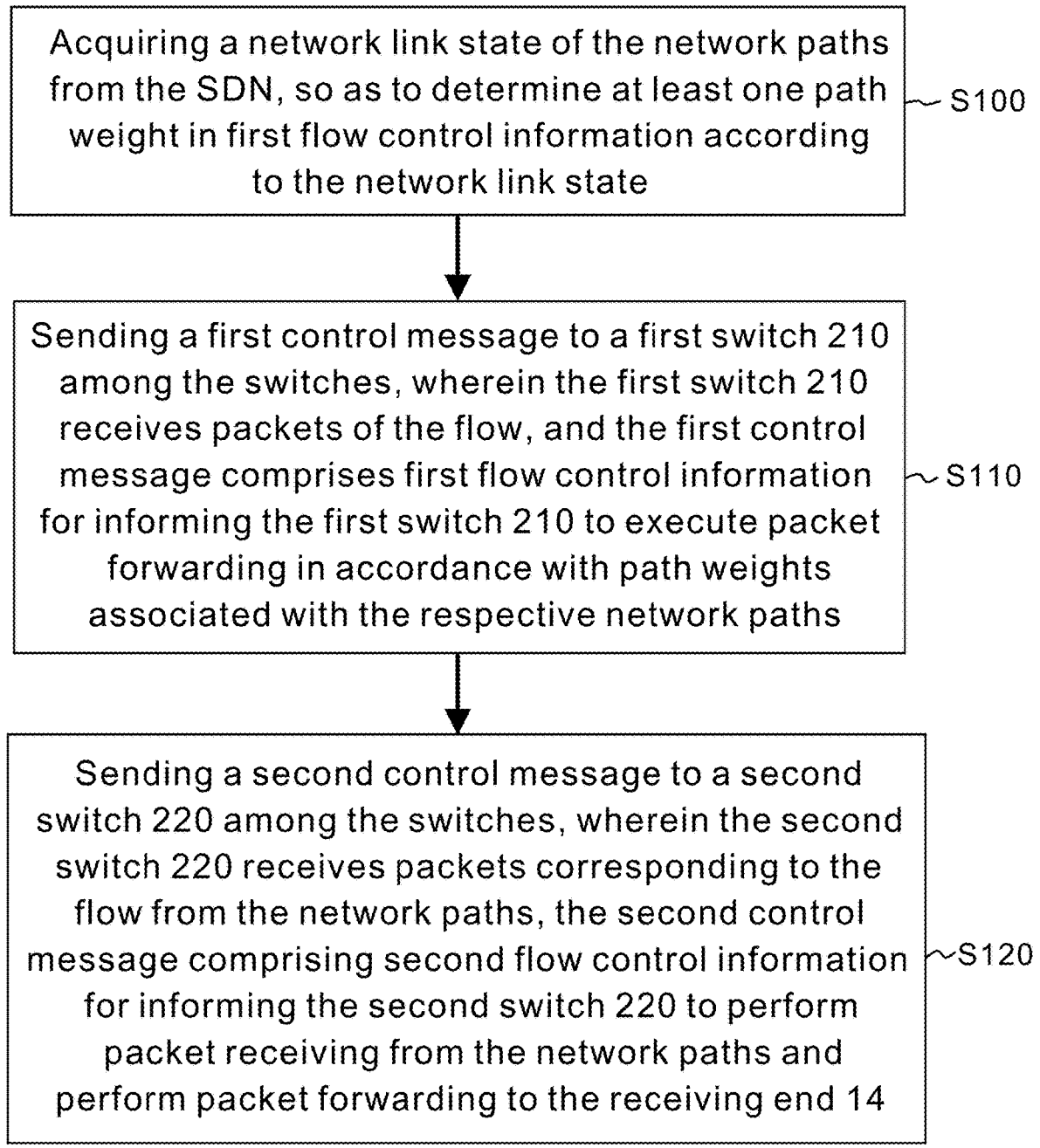
FIG. 4 is a schematic flowchart illustrating an embodiment based on the method illustrated by FIG. 3.

FIG. 4 is a schematic flowchart illustrating an embodiment based on the method illustrated by FIG. 3. Compared with the embodiment illustrated by FIG. 3, the embodiment illustrated by FIG. 4 further includes step S100. As shown in FIG. 4, step S100 involves acquiring a network link state of the network paths from the SDN, so as to determine at least one path weight in the first flow control information according to the network link state. In the embodiment illustrated by FIG. 4, prior to steps S110, S120, the network controller 200 checks the network link state of the SDN so as to determine path weights or further configure the other switches.

In an embodiment, the network link state comprises at least one parameter group indicative of network link attributes associated with the network paths, respectively, wherein the network link attributes are bandwidth, packet loss rate, delay, or jitter.

In an embodiment, at least one parameter group of the network link state comprises a first parameter group and a second parameter group. The first parameter group is indicative of bandwidths associated with the network paths, respectively. The second parameter group is indicative of packet loss rates associated with the network paths, respectively.

In an embodiment, given three network paths P1, P2, P3, their respective packet loss rates $L_1$, $L_2$, $L_3$ (for example, a first parameter group), available bandwidths $B_1$, $B_2$, $B_3$ (for example, a second parameter group), and path weights $W_1$, $W_2$, $W_3$, the network framework illustrated by FIG. 1 or FIG. 2 transmits one single flow (or a flow subjected to network coding and described below) with the network paths P1, P2, P3. For instance, effective bandwidths of the paths are expressed by $E_1=B_1(1-L_1)$, $E_2=B_2(1-L_2)$, and $E_3=B_3(1-L_3)$, respectively. The flow (or a flow subjected to network coding) is transmitted according to the effective bandwidths; thus, the path weights $W_1$, $W_2$, $W_3$ of the three paths are configured as follows:

$$W_1 = \frac{E_1}{E_1+E_2+E_3} = \frac{B_1(1-L_1)}{B_1(1-L_1)+B_2(1-L_2)+B_3(1-L_3)} \quad \text{(equation 1)}$$

$$W_2 = \frac{E_2}{E_1+E_2+E_3} = \frac{B_2(1-L_2)}{B_1(1-L_1)+B_2(1-L_2)+B_3(1-L_3)}$$

$$W_3 = \frac{E_3}{E_1+E_2+E_3} = \frac{B_3(1-L_3)}{B_1(1-L_1)+B_2(1-L_2)+B_3(1-L_3)}$$

In an embodiment, any Q network paths (Q>1) are inferred with equation 1 to accordingly determine the path weights of the network paths, respectively. In another embodiment, by the same assumption that the bandwidths of multiple paths are identical or similar, the path weights of respective network paths are determined according to the packet loss rates. In the preceding embodiment, the path weights $W_1$, $W_2$, $W_3$ of the three network paths can be expressed by $$W_q = \frac{\frac{1}{L_q}}{\frac{1}{L_1}+\frac{1}{L_2}+\frac{1}{L_3}} \quad \text{(equation 2)}$$

where q=1, 2 or 3. In an embodiment, any Q network paths (Q>1) are inferred with equation 2 to accordingly determine the path weights of the network paths, respectively. In an embodiment, by the same assumption that the bandwidths of multiple paths are identical or similar, the path weights of respective network paths are determined in a way expressed by the aforesaid equation 2 and in accordance with the data pertaining to delay (or jitter) of the packets. In an embodiment, the path weights of respective network paths are determined in a way expressed by the aforesaid equation 1 or 2 and in accordance with the data pertaining to one, two or more of the network link attributes.

Figure 5:
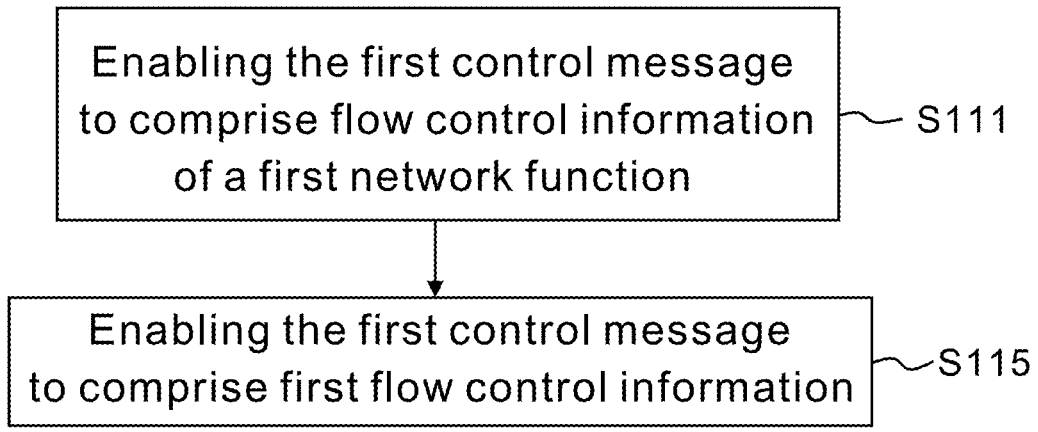
FIG. 5 is a schematic flowchart illustrating an embodiment of step S110 in FIG. 3.

FIG. 5 is a schematic flowchart illustrating an embodiment of step S110 in FIG. 3. In step S111, the network controller 200 is configured to enable the first control message to comprise flow control information of a first network function. In step S115, the network controller 200 is configured to enable the first control message to comprise first flow control information.

In an embodiment, the network controller 200 is further configured to enable the first control message to further comprise flow control information of a first network function. The flow control information of the first network function is used to inform the switch 210 to forward the flow to at least one network node outside of the network paths, so as to execute the first network function. As shown in FIG. 2, the first network function is executed at the network node 12. For example, the first network function comprises network coding.

In an embodiment, the flow control information of the first network function further is used to inform the switch 210 to receive adjusted packets corresponding to the first network function from the at least one network node and thus enables the switch 210 to execute packet forwarding according to the first flow control information and in accordance with the path weights associated with the network paths, respectively.

Figure 6:
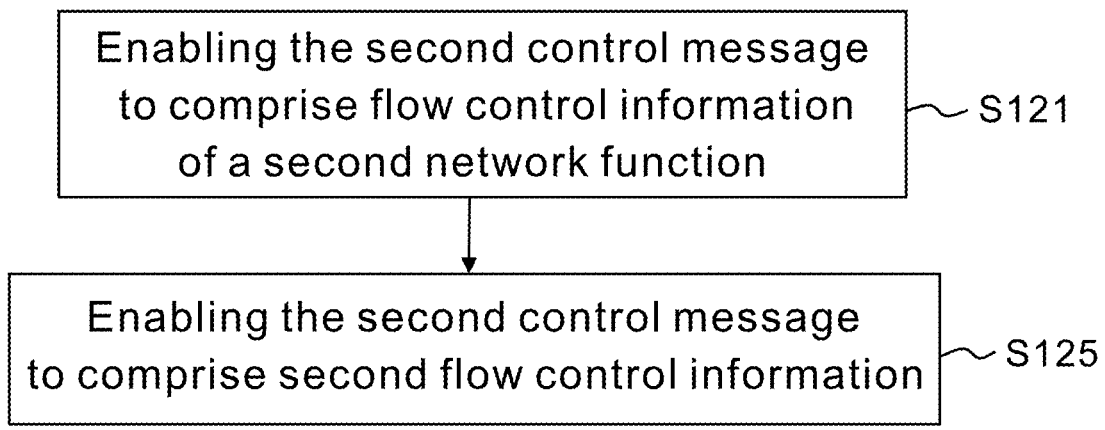
FIG. 6 is a schematic flowchart illustrating an embodiment of step S120 in FIG. 3.

FIG. 6 is a schematic flowchart illustrating an embodiment of step S120 in FIG. 3. In step S121, the network controller 200 is configured to enable the second control message to comprise flow control information of a second network function. In step S125, the network controller 200 is configured to enable the second control message to comprise second flow control information.

In an embodiment of the present disclosure, the network controller 200 is further configured to enable the second control message to further comprise flow control information of a second network function. The flow control information of the second network function is used to inform the switch 220 to receive packets according to the second flow control information. Then, the received packets are forwarded to at least another network node outside of the network paths, so as to execute the second network function. For example, as shown in FIG. 2, the network node 13 executes the second network function. For example, the second network function comprises network decoding.

In an embodiment of the present disclosure, the flow control information of the second network function further is used to inform the switch 220 to receive adjusted packets corresponding to the second network function from the at least another network node, such that the switch 220 forwards packets to the receiving end 14 according to the second flow control information.

In an embodiment, for example, one single flow is propagated along a plurality of paths P1, P2 to PN in the network framework of FIG. 2. Functions, namely network coding and network decoding, are executed at the network nodes 12, 13, respectively, by the multi-path stochastic switching as disclosed in the aforesaid embodiments, so as to enhance transmission bandwidth and transmission efficiency. For example, functions, namely network coding and network decoding, are effected with the network framework of FIG. 2 and by random linear network coding (RLNC).

Figure 7:
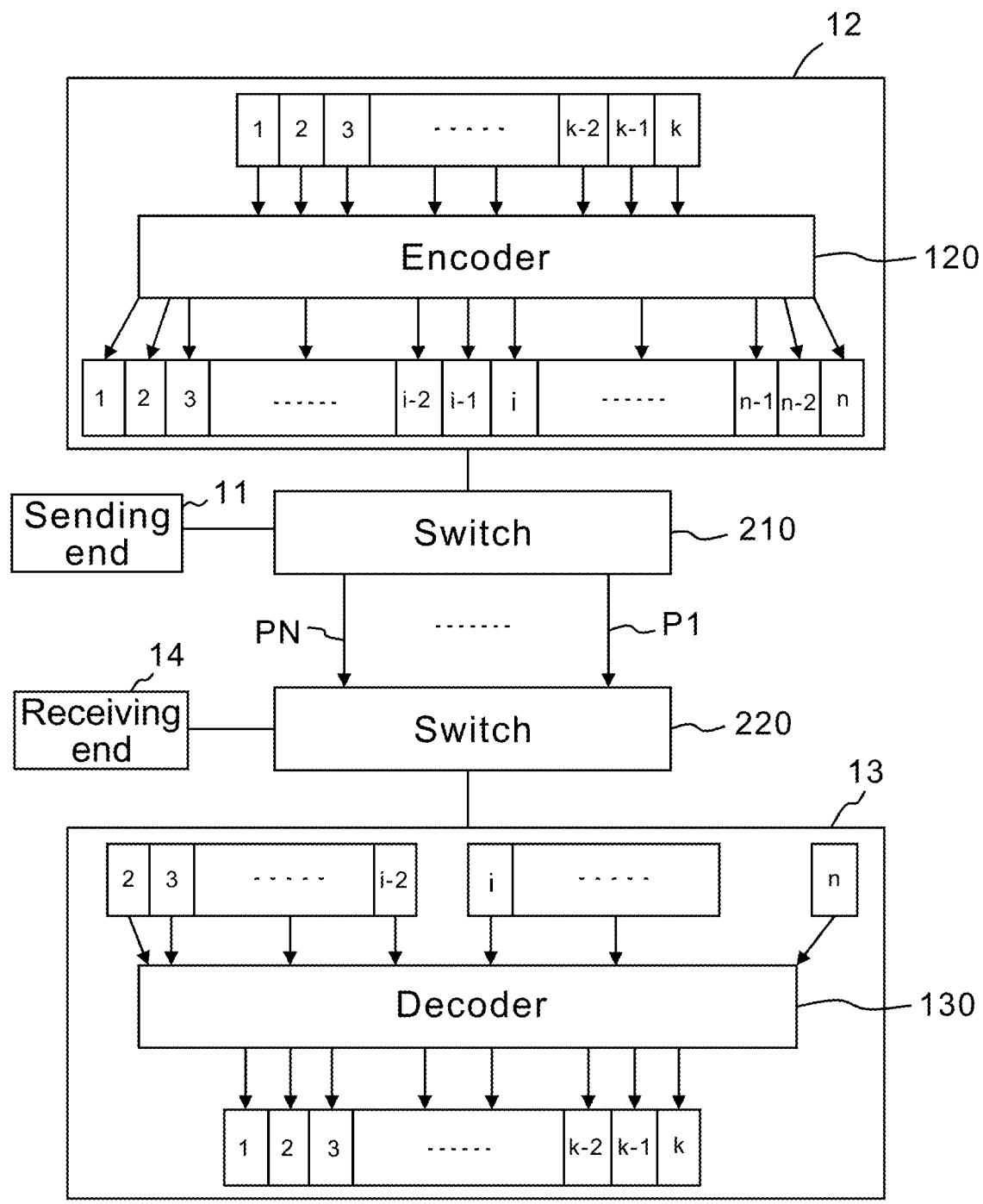
FIG. 7 is a schematic view illustrating implementation of network coding based on the method of FIG. 3.

Regarding random linear network coding, for instance, the switch 210 forwards packets from the sending end 11 to the network node 12, and an encoder 120 performs the network coding operation on the network node 12, for example, using a software program or a combination of software and hardware. Referring to FIG. 7, an encoder for the network coding is implemented by the network node 12 so as to realize a type of network coding, for example, random linear network coding. The random linear network coding involves choosing randomly from a finite field a plurality of coefficients in the number of k to form a code vector and performing linear combination on k source symbols according to the vector so as to code the data. The network node 12 receives the packets from the switch 210 and then performs random linear network coding; to the end, the network node 12 divides a plurality of packets (regarded as a set of original packets) into several blocks of the same size, with each block divided into several symbols. The network node 12 divides a plurality of packets into several blocks, for example, as soon as a plurality of packets are received in one instance or when the number of packets received reaches a threshold (for example, 50, 100, 500 or 1000). After that, n code vectors are randomly generated to encode symbols in the current blocks by linear combination and thus generate n encoded symbols. One of the encoded symbols is obtained by a summation of k symbols according to a code vector. Given a code rate r, performing network coding on k symbols generates n encoded symbols, such that n=k*r. When the n encoded symbols are sent to the switch 220 via multiple paths, the switch 220 forwards the n encoded symbols to the network node 13 for network decoding. The network node 13 implements a decoder 130 to execute the network decoding operation, for example, using a software program or a combination of software and hardware. Upon receipt of the encoded symbols, the network node 13 executes XOR operations in order to effectuate decoding. The count s of the encoded symbols received by the network node 13 is greater than k (i.e., s>k), such that the network node 13 can restore the received encoded symbols to original symbols (regarded as the original packet set) to be returned to the switch 220 and then forwarded to the receiving end 14 via the switch 220. Although encoded symbols may get lost in the course of multi-path transmission of packets from the switch 210 to the switch 220, the receiving end can restore the original symbols without the sending end re-sending the lost encoded symbols, provided that the count s of the encoded symbols received is greater than k. Compared with conventional single-path transmission, the method disclosed in the embodiments of the present disclosure employs multi-path transmission and accordingly enhances transmission bandwidth and dispenses with the hassle of re-sending lost packets, thus enhancing transmission efficiency.

In an embodiment of the generation of encoded symbols for network coding, one of the encoded symbols can be obtained by using exclusive OR (XOR) summation of products of a code vector and k symbols. For instance, if a code vector is "1010" and 4 symbols (e.g., k=4) are indicated by SB1, SB2, SB3 and SB4, a corresponding encoded symbol can be obtained by (1·SB1)⊕(0·SB1)⊕(1·SB1)⊕(0·SB1). Certainly, the way of generation the encoded symbols can be implemented in any appropriate manner for network coding.

In the conventional approach that sends packets to the receiving end via multiple different paths, the received packets may get out of order. This drawback, however, can be overcome by the method provided in the embodiments of the present disclosure. For instance, in the embodiment illustrated by FIG. 7, encoded symbols are transmitted in the course of multi-path transmission from the switch 210 to the switch 220 and do not have any serial numbers. The receiving end can restore the original symbols, provided that the receiving end receives any sufficient number of encoded symbols.

In this embodiment, the encoder and decoder for use in network coding and decoding are implemented in the network nodes 12, 13, respectively. Both the multi-path transmission and network coding are transparent to the sending end and the receiving end. The sending end 11 and the receiving end 14 do not require any additional computing resources and hardware resource consumption. Although the aforesaid embodiment is exemplified by random linear network coding, implementation of the present disclosure is not restricted to the aforesaid embodiment. For example, variant embodiments of the present disclosure can be accomplished by changing any appropriate network coding of the aforesaid embodiment to one applicable to the network framework shown in FIG. 2.

In an embodiment, the network coding is carried out with a virtual network function (VNF). Furthermore, the lower limit of the code rate for network coding is obtained in accordance with the network link state. The network controller 200 controls the VNF according to the lower limit in order to effectuate network coding at an appropriate code rate, as described below. For instance, given the network framework illustrated by FIG. 2, one single flow of video files or video streaming, for example, is transmitted from the sending end 11 to the receiving end 14 by stochastic switching with network coding. The network coding is executed at the network node 12. The network decoding is executed at the network node 13. Related details about the other switches are disclosed in related embodiments and thus are, for the sake of brevity, not described again. At the code rate r of network coding, performing network coding on k symbols at the network node 12 generates n encoded symbols, such that n=k×r. The n encoded symbols are sent through the switch 210, by stochastic switching, and via a plurality of network paths (for example, three network paths P1, P2, P3). Then, the switch 220 forwards the n encoded symbols to the network node 13 to perform network decoding, wherein the count s of the code symbols received by the network node 13 is expressed as follows:

$$s = k \times r \times W_1 \times (1-L_1) + k \times r \times W_2 \times (1-L_2) + k \times r \times W_3 \times (1-L_3) \quad \text{(equation 3)}$$

Path weights are substituted into the aforesaid equation according to equation 1 to obtain equation 4 below.

$$s = \frac{k \times r}{E_1 + E_2 + E_3} \times (E_1(1-L_1) + E_2(1-L_2) + E_3(1-L_3)) \quad \text{(equation 4)}$$

Code symbol count s is greater than the number k of non-coded symbols (i.e., s>k). This condition is substituted into equation 4 to obtain equation 5 below.

$$r > \frac{E_1 + E_2 + E_3}{E_1(1-L_1) + E_2(1-L_2) + E_3(1-L_3)} = \quad \text{(equation 5)}$$

$$\frac{B_1(1-L_1) + B_2(1-L_2) + B_3(1-L_3)}{B_1(1-L_1)^2 + B_2(1-L_2)^2 + B_3(1-L_3)^2}$$

Therefore, in this embodiment, the network controller 200 obtains the lower limit of the code rate for network coding according to the network link state (for example, bandwidth and packet loss rate). For example, the lower limit is determined according to equation 5, so as to control the VNF to effect network coding at an appropriate code rate.

Figure 8:
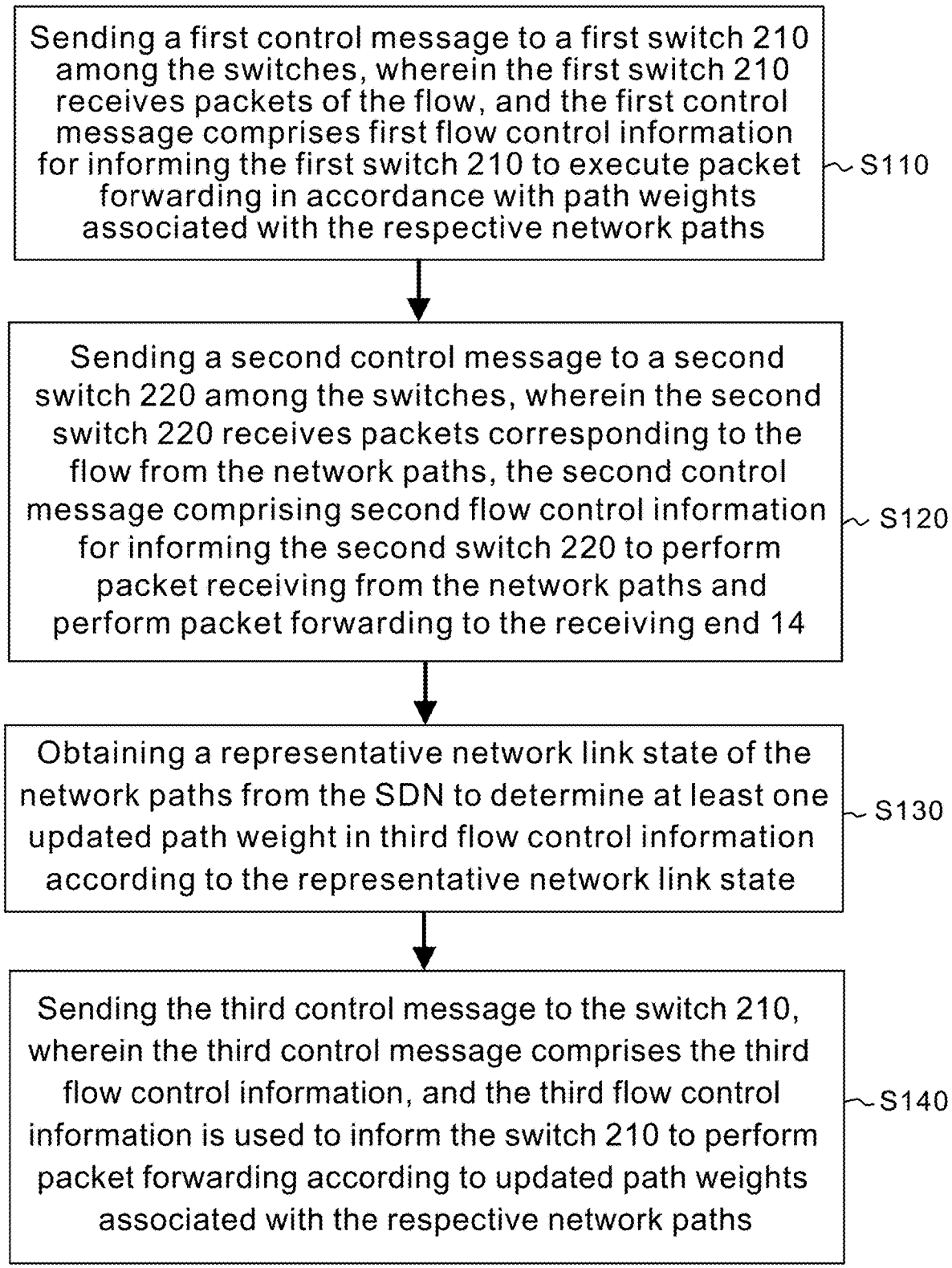
FIG. 8 is a schematic flowchart illustrating another embodiment of the method illustrated by FIG. 3.

FIG. 8 is a schematic flowchart illustrating an embodiment of the method illustrated by FIG. 3. Compared with the embodiment illustrated by FIG. 3, the embodiment illustrated by FIG. 8 further comprises steps S130, S140. In step S130, the network controller 200 obtains a representative network link state of the network paths from the SDN to determine at least one updated path weight in a third flow control information according to the representative network link state. In step S140, the network controller 200 sends the third control message to the switch 210, wherein the third control message comprises the third flow control information, and the third flow control information is used to inform the switch 210 to forward packets according to updated path weights associated with the network paths, respectively.

In an embodiment, the representative network link state comprises at least one parameter group indicative of network link attributes associated with the network paths, respectively, wherein the network link attributes are bandwidth, packet loss rate, delay, or jitter. For details about the determination of path weights, refer to related embodiments or embodiments related to equation 1 or 2.

In the embodiment illustrated by FIG. 8, the network controller 200 is configured to continuously or dynamically monitor link-related situation on the network. When the network controller 200 discovers a problem with the link or a link performance change, for example, path packet loss rate increase or path congestion which causes a decrease in the bandwidth available to the link. From the perspective of the network framework illustrated by FIG. 1 or FIG. 2, the network controller 200 is configured to calculate path weights anew in accordance with equation 1 or 2 (or its inferred equation). Alternatively, regarding the network framework shown in FIG. 2, the network controller 200 is configured to further check the code rate and thus determine whether to change the code rate of the network coding, for example, in accordance with the lower limit of the code rate expressed in equation 5. Therefore, the present disclosure effectively enhances the aforesaid performance of multipath transmission or performance of network coding-enabling multi-path transmission.

In an embodiment, the path weights can be dynamically adjusted. For instance, at a specific point in time, the network controller 200 is allocated with path weights, also known as nominal weights, which are calculated in accordance with equation 1 or 2 (or its inferred equation), and the network controller 200 sends by the OpenFlow specification an instruction to a switch (for example, the switch 210), so as to configure weights (also known as applied weights) of bucket selection in the group table. It is because, in some dynamic network environment (for example, wireless network), changes in the link parameters (for example, available bandwidth and packet loss rate) are likely to be transient because of a large change in the network flow rate. In practice, if the aforesaid situation occurs, the network controller 200 will obtain applied weights by performing a smoothening process on the calculated nominal weights. For example, a smoothening process is carried out according to a moving average (of past values in a specific time period), so as to filter out the noise associated with all the values in the specific time period. The smoothened, calculated nominal weights serve as an indicator of following or lagging behind a trend. For example, in an embodiment, calculation of the moving average at a specific point in time requires configuration of a window of a target value. For example, the window of intervals in the number of p (for example, p=20) is calculated by adding the current parameters and the recorded p−1 parameters and then averaging the recorded p parameters. The applied weights thus calculated better indicate favorable and unfavorable changes in the transmission performance of the current network link. In another embodiment, thanks to the smoothening process or related process performed on path weights, the trend of the link performance can be predicted according to network link performance-related data, so as to prevent congestion of the network link in good time by allocating transmission flow rate of the path as early as possible (steps S130, S140 shown in FIG. 8). In an embodiment, the network controller 200 is configured to calculate nominal weights at multiple points in time by moving averaging to accordingly obtain applied weights and then give an instruction to allocate applied weights to a switch (for example, the switch 210 shown in FIG. 1 or FIG. 2); thus, the switch configures the transmission probability of different transmission paths according to applied weights, such that the path weights can be dynamically adjusted. Therefore, the transmission mechanism for one single flow multi-path transmission, such as the multi-path stochastic switching (MPSS) mechanism or the multi-path stochastic switching with network coding (MPSSNC) mechanism, can dynamically, adaptively and effectively take place.

Figure 9:
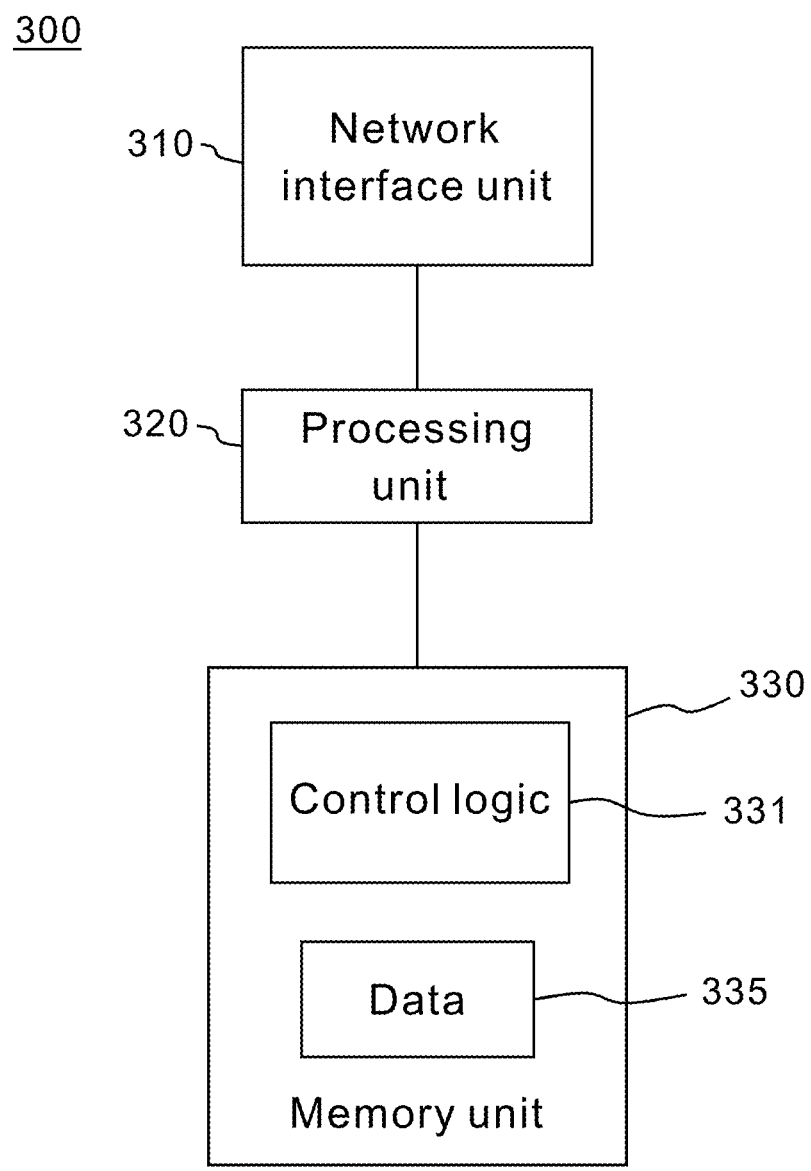
FIG. 9 is a schematic view of a network controller for use in the SDN according to an embodiment of the present disclosure.

FIG. 9 is a schematic view of a network controller for use in the SDN according to an embodiment of the present disclosure. As shown in FIG. 9, a computing device 300 comprises a network interface unit 310 and at least one processing unit 320. The computing device 300 is required for the network controller 200 to function. The network interface unit 310 is configured to communicate with the SDN. The at least one processing unit 320 is coupled to the network interface unit 310 and configured to execute operations which facilitate a flow from the sending end 11 to the receiving end 14 by multi-path transmission by means of the use of a plurality of network paths, so as to enable the multi-path transmission to be transparent to the sending end 11 and the receiving end 14. The operations comprise sending a first control message to a switch 210 among the switches, wherein the switch 210 receives packets of the flow (for example, from the sending end 11 directly or indirectly). The first control message comprises first flow control information. The first flow control information is used to inform the switch 210 to forward packets according to path weights associated with the network paths, respectively. The operations further comprise sending a second control message to a switch 220 among the switches, wherein the switch 220 receives packets corresponding to the flow (for example, packets, whose destination is the receiving end 14) from the network paths. The second control message comprises second flow control information. The second flow control information is used to inform the switch 220 to perform packet receiving from the network paths and perform packet forwarding to the receiving end 14.

The computing device 300 further comprises a memory unit 330. The memory unit 330 stores a control logic 331 and data 335. The control logic 331 is, for example, provided in the form of program codes or instructions to be executed with a view to carrying out the method of the present disclosure according to at least one of the embodiments (illustrated by FIG. 3 to FIG. 8) or a combination thereof. The data 335 is, for example, to be recorded or temporarily stored in order for the control logic 331 to be executed. Examples of the data 335 include control message and network link state.

The network controller 200 is applicable to at least one of the embodiments, or any combination of as appropriate, of the aforesaid method.

Figure 10:
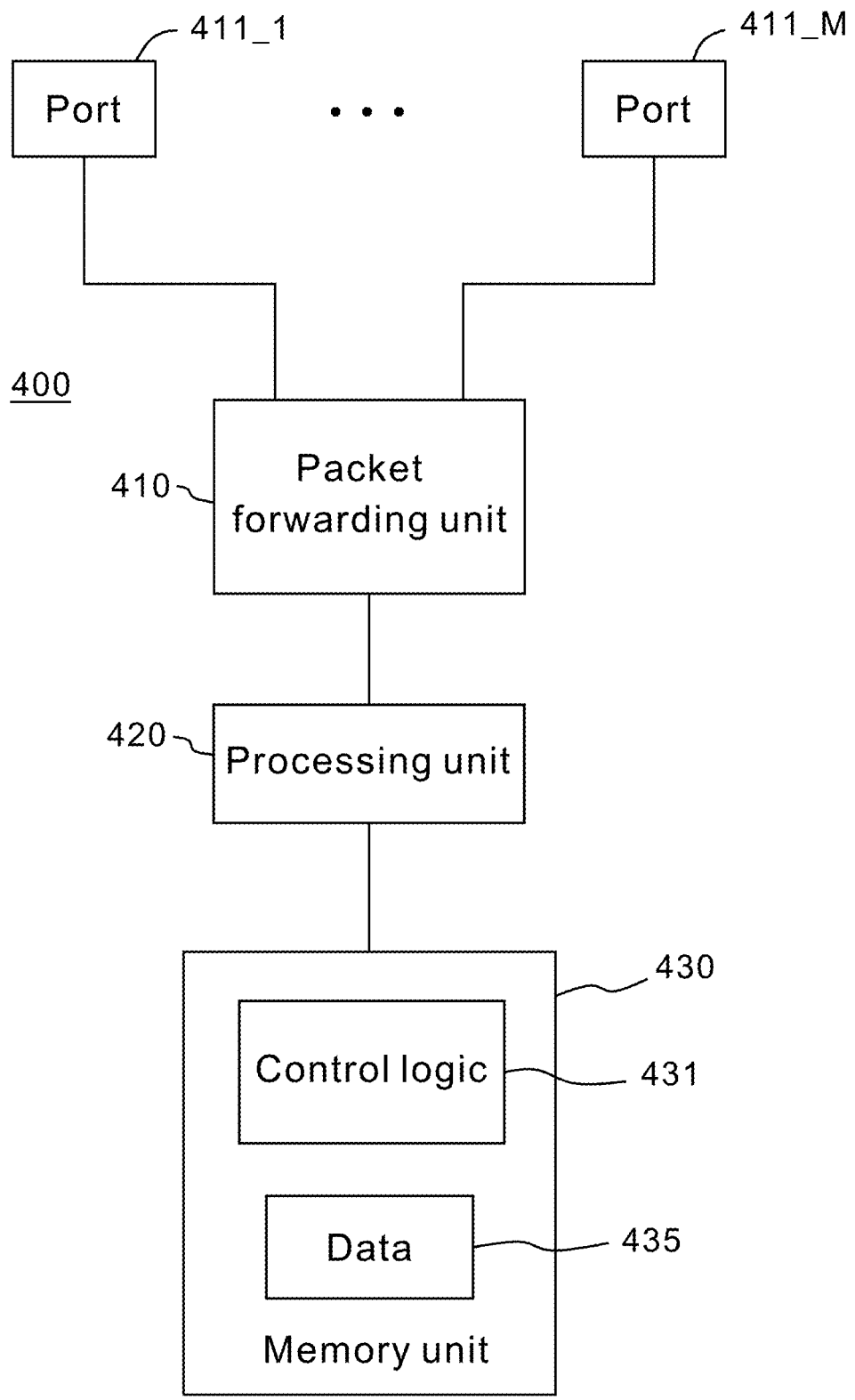
FIG. 10 is a schematic view of a switch for use in the SDN according to an embodiment of the present disclosure.

FIG. 10 is a schematic view of a switch for use in the SDN according to an embodiment of the present disclosure. As shown in FIG. 10, the switch 400 comprises a packet forwarding unit 410 and a processing unit 420. The switch 400 is applicable to network framework illustrated by FIG. 1 or FIG. 2. The packet forwarding unit 410 connects to ports 411_1 to 411_M (where M is a positive integer greater than 1.) The switch 400 further comprises a memory unit 430. The memory unit 430 stores the control logic 431 and data 435. The control logic 431 is, for example, provided in the form of program codes or instructions to be executed by the switch 400 (a switch shown in FIG. 1 or FIG. 2) with a view to implementing at least one of the embodiments (illustrated by FIG. 3 to FIG. 8) or a combination thereof of the present disclosure. The data 435 is, for example, to be recorded or temporarily stored in order for the control logic 431 to be executed. Examples of the data 435 include flow control information and data (such as flow table) for use with OpenFlow specification.

Figure 11:
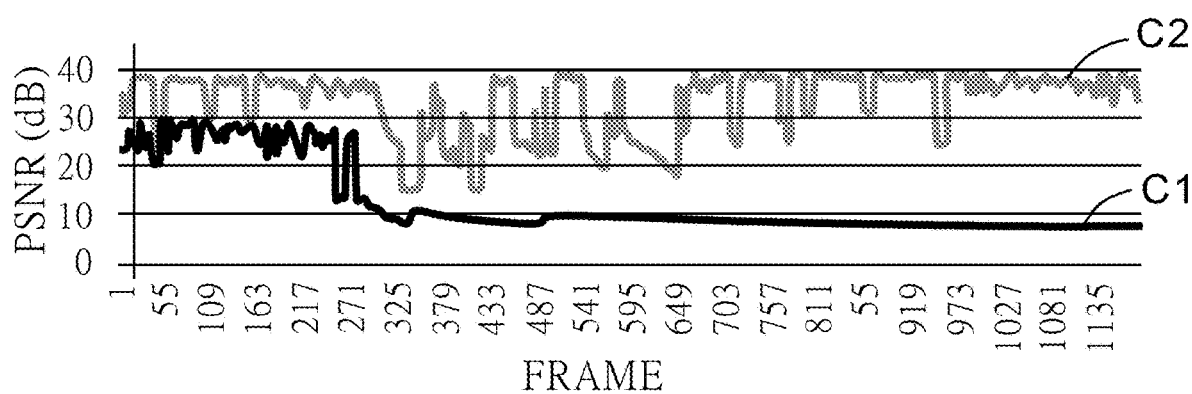
FIG. 11 is a schematic view for comparing performance of stream images transmitted by one single conventional path transmission and performance of the stream images transmitted by multi-path transmission according to an embodiment of the present disclosure.

FIG. 11 is a schematic view for comparing performance of stream images transmitted by one single conventional path transmission and performance of the stream images transmitted by multi-path transmission according to an embodiment of the present disclosure. In a conventional network environment, one single path transmission can be created with an algorithm of searching for a constrained shortest path (CSP) which meets related conditions, and the transmission path thus created meets a specific condition (such as the least bandwidth or delay). However, the transmission path thus created achieves the routing of one single path; thus, in case of a failure of the link, for example, insufficient available bandwidth or link jam, there will be a great increase in the packet loss rate along the link or even an interruption of the transmission path. The aforesaid experiment shows that, in case of insufficient available bandwidth of the link, the quality of stream image transmission is poor, because the CSP mechanism is the routing for creating one single path, and the link cannot switch paths. Referring to FIG. 11, curve C1 depicts the peak signal-to-noise ratio (PSNR) of stream images transmitted by one single path transmission, showing that the transmission quality is poor all the way from the beginning to the end for lack of any adjustment mechanism. Furthermore, curve C1 shows an average PSNR of 12.54 dB.

In the embodiment illustrated by FIG. 2, one single flow multi-path transmission is achieved by the stochastic switching mechanism in the software-defined network environment. In this embodiment, a network controller monitors and records the link state of the network environment all the time, calculates the link weights for data transmission, and achieves smoothened weight adjustment according to a moving average, so as for the link weights to be timely adjusted even if multiple path transmission experiences a decrease in link transmission performance, thus improving transmission quality. FIG. 10 shows curve C2 which depicts peak signal-to-noise ratio (PSNR) corresponding to the one single flow multi-path transmission, wherein the average PSNR is 31.6 dB. As shown in FIG. 10, insufficient available bandwidth and overly high packet loss rate occur after the 271th signal frame. The comparative result of the stream image transmission experiment shows that this embodiment (depicted by curve C2) can effectively cope with insufficient available bandwidth and overly high packet loss rate in a network environment and appropriately adjust the network flow rate. Therefore, when the link transmission performance is unsatisfactory, this embodiment instantly avoids using the network path transmission to not only avoid a data transfer interruption otherwise caused by one single transmission path failure but also enhance the usage rate of the network bandwidth and the overall network throughput. Therefore, the aforesaid experiment proves effective in achieving satisfactory transmission performance and stream image transmission quality.

The present disclosure further provides a computer program product which comprises multiple instructions. The instructions enable a computer to execute the method for facilitating a flow from a sending end 11 to a receiving end by multi-path transmission 14 according to at least one of embodiments. In an embodiment, the computer program product comprises a storage medium, such as non-transitory storage medium, which stores computer-readable instructions (or program code), wherein the instructions are executed on at least one computing device (for example, the network controller 200), such that the at least one computing device carries out the method according to at least one of the embodiments. The method is illustrated by FIG. 3 and carried out according to any one of the aforesaid embodiments or any combinations thereof. For instance, the program code comprises, for example, one or more programs or program modules, for use in carrying out the method according to steps S110 to S120 of FIG. 3 (or according to at least one of embodiments or a combination thereof as illustrated by FIG. 3 to FIG. 8) and in any appropriate sequence. When the computing device (for example, the network controller 200) executes the program code, the computing device executes the method according to the embodiment illustrated by FIG. 3. The embodiment of the storage medium includes, but is not limited to, optical information storage medium, magnetic information storage medium or memory (such as memory card, firmware, ROM or RAM). For instance, the computing device comprises a communication unit, processing unit and storage medium. The processing unit is electrically coupled to the communication unit and storage medium. The processing unit communicates with a communication network through the communication unit in a wireless or wired manner, so as to communicate with any other computing device, such as a terminal device. The processing unit comprises one or more processors. The computing device comprises any other device, such as a graphics processor, to perform computing. In an embodiment, the computing device can execute an operating system and is further implemented by one or more means of appropriate network and software technology, such as a server for network service, script engine, network application program or network application program interface (API).

The above embodiments are based on an SDN and applied to multi-path transmission of a second layer in a network communication protocol model (for example, to transmit packets of one single flow in a network, intermediate forwarding nodes forward different packets through different transmission interfaces), such that the multi-path transmission is transparent to the sending end and the receiving end. Owing to the network transparency, when the sending end 11 wants to send packets to the receiving end 14, the sending end address and receiving end address (for example, IP code, MAC, port) in the packets sent from the sending end 11 need not be changed, thus effecting one single flow multi-path transmission. By contrast, conventional MPTCP entails carrying out fixed, different path transmission via multiple flows (or known as subflows), respectively. The sending end must support at least two network cards. To achieve this purpose, not only do multiple subflows have respective sending end addresses (for example, different in at least one of IP code and MAC), but it is also necessary for the sending end and receiving end to come with specific software or necessary to alter original application program. Therefore, the present disclosure not only facilitates one single flow multi-path transmission but is also practically convenient to the sending end and receiving end. Therefore, application of the SDN technology facilitates the multi-path stochastic switching (MPSS) mechanism or the multi-path stochastic switching with network coding (MPSSNC) mechanism, so as to enhance the performance of transmitting the packets in one single flow through multiple paths.

While the present disclosure has been described by means of specific embodiments, numerous modifications and variations could be made thereto by those skilled in the art without departing from the scope and spirit of the present disclosure set forth in the claims.

What is claimed is:

1. A method for facilitating a flow from a sending end to a receiving end by multi-path transmission, the method being applied to a network controller of a software-defined network (SDN), the software-defined network comprising a plurality of switches, the switches being adapted to execute packet forwarding from the sending end to the receiving end, the method comprising:
  executing, by the network controller, operations, that controls a flow from the sending end to reach the receiving end by multi-path transmission using a plurality of network paths, so as to enable the multi-path transmission to be transparent to the sending end and the receiving end, the operations comprising:
  sending a first control message to a first switch among the switches, wherein the first switch receives packets of the flow, and the first control message comprises first flow control information that informs the first switch to execute packet forwarding in accordance with path weights associated with the respective network paths; and
  sending a second control message to a second switch among the switches, wherein the second switch receives packets corresponding to the flow from the network paths, the second control message comprises second flow control information that informs the second switch to perform packet receiving from the network paths and to perform packet forwarding to the receiving end.

2. The method of claim 1, wherein the operations further comprise acquiring a network link state of the network paths from the SDN to determine at least one path weight in the first flow control information according to the network link state.

3. The method of claim 2, wherein the network link state comprises at least one parameter group indicative of network link attributes associated with the network paths, respectively, wherein the network link attributes are bandwidth, packet loss rate, delay, or jitter.

4. The method of claim 3, wherein at least one parameter group of the network link state comprises a first parameter group and a second parameter group, the first parameter group representing bandwidths associated with the respective network paths, and the second parameter group representing packet loss rates associated with the respective network paths.

5. The method of claim 1, wherein the network controller enables the first control message to further comprise flow control information of a first network function, and the flow control information of the first network function informs the first switch to forward the flow to at least one network node outside of the network paths, so as to execute the first network function.

6. The method of claim 5, wherein the flow control information of the first network function further informs the first switch to receive adjusted packets corresponding to the first network function from the at least one network node so that the first switch to execute packet forwarding according to the first flow control information and in accordance with path weights associated with the network paths, respectively.

7. The method of claim 6, wherein the first network function comprises network coding.

8. The method of claim 1, wherein the network controller enables the second control message to further comprise flow control information of a second network function, and the flow control information of the second network function informs the second switch to perform packet receiving according to the second flow control information and then forward received packets to at least another network node outside of the network paths, so as to execute the second network function.

9. The method of claim 8, wherein the flow control information of the second network function further informs the second switch to receive adjusted packets corresponding to the second network function from the at least another network node so that the second switch performs packet forwarding to the receiving end according to the second flow control information.

10. The method of claim 9, wherein the second network function comprises network decoding.

11. The method of claim 1, wherein the operations further comprise:
  acquiring a representative network link state of the network paths from the SDN to determine at least one updated path weight in a third flow control information according to the representative network link state; and
  sending the third control message to the first switch, wherein the third control message comprises the third flow control information, and the first flow control information informs the first switch to execute packet forwarding in accordance with the updated path weights associated with the network paths, respectively.

12. The method of claim 11, wherein the representative network link state comprises at least one parameter group indicative of network link attributes associated with the network paths, respectively, wherein the network link attributes are bandwidth, packet loss rate, delay, or jitter.

13. A computer program product comprising a non-transitory storage medium storing instructions, the instructions enabling at least one computing device to execute the method of claim 1.

14. A network controller for use in a software-defined network (SDN) comprising a plurality of switches adapted to execute packet forwarding from a sending end to a receiving end, the network controller comprising:
- a network interface unit configured to communicate with the SDN; and
- at least one processing unit coupled to the network interface unit and configured to execute operations, that controls a flow from the sending end to reach the receiving end by multi-path transmission using a plurality of network paths, so as to enable the multi-path transmission to be transparent to the sending end and the receiving end, the operations comprising:
  - sending a first control message to a first switch among the switches, wherein the first switch receives packets of the flow, and the first control message comprises first flow control information, the first flow control information informs the first switch to execute packet forwarding in accordance with path weights associated with the network paths, respectively; and
  - sending a second control message to a second switch among the switches, the second switch receiving packets corresponding to the flow from the network paths, the second control message comprising second flow control information, the second flow control information informs the second switch to perform packet receiving from the network paths and perform packet forwarding to the receiving end.

15. The network controller of claim 14, wherein the operations further comprise acquiring network link state of the network paths from the SDN to determine at least one path weight in the first flow control information according to the network link state.

16. The network controller of claim 15, wherein the network link state comprises at least one parameter group indicative of network link attributes associated with the network paths, respectively, wherein the network link attributes are bandwidth, packet loss rate, delay, or jitter.

17. The network controller of claim 14, wherein the network controller is further configured to enable the first control message to further comprise flow control information of a first network function, and the flow control information of the first network function informs the first switch to forward the flow to at least one network node outside of the network paths, so as to execute the first network function, wherein the first network function comprises network coding.

18. The network controller of claim 17, wherein the flow control information of the first network function further informs the first switch to receive adjusted packets corresponding to the first network function from the at least one network node so that the first switch to execute packet forwarding according to the first flow control information and in accordance with path weights associated with the network paths, respectively.

19. The network controller of claim 14, wherein the network controller is further configured to enable the second control message to further comprise flow control information of a second network function, and the flow control information of the second network function informs the second switch to perform packet receiving according to the second flow control information and then forward received packets to at least another network node outside of the network paths, so as to execute the second network function, wherein the second network function comprises network decoding.

20. The network controller of claim 19, wherein flow control information of the second network function further informs the second switch to receive adjusted packets corresponding to the second network function from the at least another network node, such that the second switch performs packet forwarding to the receiving end according to the second flow control information.

* * * * *